United States Patent
Yakovenko et al.

(10) Patent No.: US 8,869,176 B2
(45) Date of Patent: Oct. 21, 2014

(54) EXPOSING HOST OPERATING SYSTEM SERVICES TO AN AUXILLARY PROCESSOR

(71) Applicant: QUALCOMM Incorporated, San Diego, CA (US)

(72) Inventors: Anatoly E. Yakovenko, Encinitas, CA (US); Ramesh Chandrasekhar, Oceanside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 13/721,999

(22) Filed: Dec. 20, 2012

(65) Prior Publication Data
US 2014/0136817 A1 May 15, 2014

Related U.S. Application Data

(60) Provisional application No. 61/724,378, filed on Nov. 9, 2012.

(51) Int. Cl.
*G06F 3/00* (2006.01)
*G06F 15/76* (2006.01)
*G06F 9/54* (2006.01)
*G06F 9/52* (2006.01)

(52) U.S. Cl.
CPC .............. *G06F 15/76* (2013.01); *G06F 9/547* (2013.01); *G06F 9/52* (2013.01); *G06F 9/54* (2013.01)
USPC .......................................... 719/328; 719/330

(58) Field of Classification Search
CPC .................................. G06F 9/547; G06F 9/54
USPC ................................................. 719/328, 330
See application file for complete search history.

(56) References Cited

U.S. PATENT DOCUMENTS

| | | | |
|---|---|---|---|
| 4,530,051 A | 7/1985 | Johnson et al. | |
| 5,659,701 A | 8/1997 | Amit et al. | |
| 6,038,604 A * | 3/2000 | Bender et al. | 709/233 |
| 7,076,551 B2 | 7/2006 | Gary | |
| 8,091,086 B1 * | 1/2012 | Ershov et al. | 718/1 |
| 2003/0055965 A1 * | 3/2003 | Colby et al. | 709/225 |
| 2008/0148291 A1 | 6/2008 | Huang et al. | |
| 2010/0083258 A1 | 4/2010 | Messmer | |
| 2012/0069029 A1 | 3/2012 | Bourd et al. | |

OTHER PUBLICATIONS

Kevin Klues, TOSThreads: Thread-safe and Non-Invasive Preemption in TinyOS, 2009.*
Marko Jaakola, "Performance Simulation of Multi-Processor Systems Based on Load Reallocation," VTT Publications, Vuorimiehentie, Finland, May 23, 2008.
International Search Report and Written Opinion—PCT/US2013/063891—ISA/EPO—Feb. 28, 2014.

* cited by examiner

*Primary Examiner* — Lechi Truong
(74) *Attorney, Agent, or Firm* — Nicholas A. Cole

(57) ABSTRACT

Aspect methods, systems and devices may be configured to perform two-way and/or reverse procedure calls in a computing device or across a network to offload the bulk of processing operations from a general purpose processor to an auxiliary processor, while perform operations that require access to context information locally on the general purpose processor (e.g., application processor, CPU, etc.). The two-way and/or reverse procedure calls allow an auxiliary processor to perform operations that include subroutines that require access to an application processor's or a calling process's context information, without requiring the calling process to send the context information to the auxiliary processor (e.g., as part of the procedure call/method invocation, etc.).

35 Claims, 7 Drawing Sheets

EXPOSING HOST OPERATING SYSTEM SERVICES TO AN AUXILLARY PROCESSOR

RELATED APPLICATIONS

This application claims the benefit of priority to U.S. Provisional Application No. 61/724,378, entitled "Exposing Host Operating System Services to an Auxiliary Processor" filed Nov. 9 2012, the entire contents of which are hereby incorporated by reference.

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, headphones, remote controls, etc.) have become more complex than ever, and now commonly include multiple processors, system-on-chips (SoCs), and other resources that allow mobile device users to execute complex and power intensive software applications (e.g., video streaming, video processing, etc.) on their mobile devices. With this rise in complexity and power consumption, new and improved processing solutions that better utilize the mobile device's resources and capabilities will be beneficial to consumers.

SUMMARY

The various aspects include methods of executing general purpose application operations on an auxiliary processor, including creating in an application processor of a computing device a first process and a second process, the first and second process having a first context, invoking by the second process a first service of the auxiliary processor, the first service causing the second process to enter a blocked state, invoking by the first process a second service of the auxiliary processor, the second service having a second context, unblocking the second process in response to receiving a communication from the first service of the auxiliary processor, performing, by the unblocked second process, context-based operations within the first context in the application processor, sending a result of performing context-based operations from the application processor to the auxiliary processor, the auxiliary processor performing additional operations based on the result of performing context-based operations to accomplish the second service, and receiving by the first process information generated in the auxiliary processor when accomplishing the second service.

In an aspect, invoking a first service of the auxiliary processor may include invoking the first service in a digital signal processor. In a further aspect, invoking a first service of the auxiliary processor may include invoking the first service in a modem processor. In a further aspect, invoking a first service of the auxiliary processor may include invoking the first service in a processor of the computing device. In a further aspect, invoking a first service of the auxiliary processor may include invoking the first service in a processor of a remote computing device. In a further aspect, performing context-based operations in the application processor may include performing, by the unblocked second process, context-based operations in the application processor to generate context-based information required by the second service to perform the additional operations in the auxiliary processor. In a further aspect, sending a result of performing context-based operations from the application processor to the auxiliary processor may include the application processor pushing the generated context-based information onto a communication bus.

Further aspects include a computing device that may include an application processor configured with processor-executable instructions to perform operations including creating a first process and a second process, the first and second process having a first context, invoking by the second process a first service of an auxiliary processor, the first service causing the second process to enter a blocked state, invoking by the first process a second service of the auxiliary processor, the second service having a second context, unblocking the second process in response to receiving a communication from the first service of the auxiliary processor, performing, by the unblocked second process, context-based operations within the first context, sending a result of performing context-based operations to the auxiliary processor to cause the auxiliary processor to perform additional operations based on the result of performing context-based operations to accomplish the second service, and receiving by the first process information generated in the auxiliary processor when accomplishing the second service.

In an aspect, the auxiliary processor may be a digital signal processor and application processor may be configured with processor-executable instructions such that invoking a first service of the auxiliary processor may include invoking a service of the digital signal processor. In a further aspect, the auxiliary processor may be a modem processor and application processor may be configured with processor-executable instructions such that invoking a first service of the auxiliary processor may include invoking a service of the modem processor. In a further aspect, invoking a first service of the auxiliary processor may include invoking the first service in a processor of the computing device. In a further aspect, a first service of the auxiliary processor may include invoking the first service in a processor of a remote computing device. In a further aspect, application processor may be configured with processor-executable instructions such that performing context-based operations in the application processor may include performing, by the unblocked second process, context-based operations in the application processor to generate context-based information required by the second service to perform the additional operations in the auxiliary processor. In a further aspect, the computing device may include a communication bus, in which application processor may be configured with processor-executable instructions such that sending a result of performing context-based operations from the application processor to the auxiliary processor may include the application processor pushing the generated context-based information onto the communication bus.

Further aspects include a computing device having an application processor, means for creating a first process and a second process in the application processor so that the first and second process have a first context, means for causing the second process to invoke a first service of an auxiliary processor, the first service causing the second process to enter a blocked state, means for causing the first process to invoke a second service of the auxiliary processor, the second service having a second context, means for unblocking the second process in response to receiving a communication from the first service of the auxiliary processor, means for causing the unblocked second process to perform context-based operations within the first context in the application processor, means for sending a result of performing context-based operations from the application processor to the auxiliary processor to cause the auxiliary processor to perform additional operations based on the result of performing context-based operations to accomplish the second service, and means for receiving in the application processor information generated in the auxiliary processor when accomplishing the second service.

In an aspect, the means for invoking a first service of the auxiliary processor may include means for invoking the first service in a digital signal processor. In a further aspect, the means for invoking a first service of the auxiliary processor may include means for invoking the first service in a modem processor. In a further aspect, the means for invoking a first service of the auxiliary processor may include means for invoking the first service in a processor of the computing device. In a further aspect, the means for invoking a first service of the auxiliary processor may include means for invoking the first service in a processor of a remote computing device. In a further aspect, the means for performing context-based operations in the application processor may include means for performing, by the unblocked second process, context-based operations in the application processor to generate context-based information required by the second service to perform the additional operations in the auxiliary processor. In a further aspect, the means for sending a result of performing context-based operations from the application processor to the auxiliary processor may include means for pushing the generated context-based information onto a communication bus.

Further aspects include non-transitory computer readable storage media having stored thereon application processor-executable software instructions configured to cause a processor to perform operations for offloading general purpose application operations to an auxiliary processor, the operations including creating in an application processor a first process and a second process, the first and second process having a first context, invoking by the second process a first service of the auxiliary processor, the first service causing the second process to enter a blocked state, invoking by the first process a second service of the auxiliary processor, the second service having a second context, unblocking the second process in response to receiving a communication from the first service of the auxiliary processor, performing, by the unblocked second process, context-based operations within the first context in the application processor, sending a result of performing context-based operations from the application processor to the auxiliary processor, the auxiliary processor performing additional operations based on the result of performing context-based operations to accomplish the second service, and receiving by the first process information generated in the auxiliary processor when accomplishing the second service.

In an aspect, the stored processor-executable software instructions may be configured to cause a processor to perform operations such that invoking a first service of the auxiliary processor may include invoking the first service in a digital signal processor. In a further aspect, the stored processor-executable software instructions may be configured to cause a processor to perform operations such that invoking a first service of the auxiliary processor may include invoking the first service in a modem processor. In a further aspect, the stored processor-executable software instructions may be configured to cause a processor to perform operations such that invoking a first service of the auxiliary processor may include invoking the first service in a processor of the computing device. In a further aspect, the stored processor-executable software instructions may be configured to cause a processor to perform operations such that invoking a first service of the auxiliary processor may include invoking the first service in a processor of a remote computing device. In a further aspect, the stored processor-executable software instructions may be configured to cause a processor to perform operations such that performing context-based operations in the application processor may include performing, by the unblocked second process, context-based operations in the application processor to generate context-based information required by the second service to perform the additional operations in the auxiliary processor. In a further aspect, the stored processor-executable software instructions may be configured to cause a processor to perform operations such that sending a result of performing context-based operations from the application processor to the auxiliary processor may include the application processor pushing the generated context-based information onto a communication bus.

Further aspects include a system having an auxiliary processor and an application processor coupled to the auxiliary processor. The application processor may be configured with application processor-executable instructions to perform operations including creating a first process and a second process, the first and second process having a first context, invoking by the second process a first service of the auxiliary processor to cause the second process to enter a blocked state, invoking by the first process a second service of the auxiliary processor, unblocking the second process in response to receiving a communication from the first service of the auxiliary processor, performing, by the unblocked second process, context-based operations within the first context, sending a result of performing context-based operations to the auxiliary processor, and receiving by the first process information generated in the auxiliary processor when accomplishing the second service, and in which the auxiliary processor may be configured with auxiliary processor-executable instructions to perform operations including executing the first service to cause the second process of the application processor to enter a blocked state, executing a second service in response to receiving a procedure call from the first process, suspending execution of the second service upon encountering operations requiring access to the first context, sending, from the first service, the communication to unblock the second process in the application processor, receiving the result of performing context-based operations performed on the application processor in the first context, and resuming execution of the second service and performing additional operations based on the received result of performing context-based operations.

In an aspect, the auxiliary processor may be a digital signal processor and application processor may be configured with processor-executable instructions such that invoking a first service of the auxiliary processor may include invoking a service of the digital signal processor. In a further aspect, the auxiliary processor may be a modem processor and the application processor may be configured with processor-executable instructions such that invoking a first service of the auxiliary processor may include invoking a service of the modem processor. In a further aspect, invoking a first service of the auxiliary processor may include invoking the first service in a processor of the computing device. In a further aspect, a first service of the auxiliary processor may include invoking the first service in a processor of a remote computing device. In a further aspect, the application processor may be configured with processor-executable instructions such that performing context-based operations in the application processor may include performing, by the unblocked second process, context-based operations in the application processor to generate context-based information required by the second service to perform the additional operations in the auxiliary processor. In a further aspect, the computing device may include a communication bus, in which application processor may be configured with processor-executable instructions such that sending a result of performing context-based operations from the application processor to the auxiliary processor may include the application processor pushing the generated context-based information onto the communication bus.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
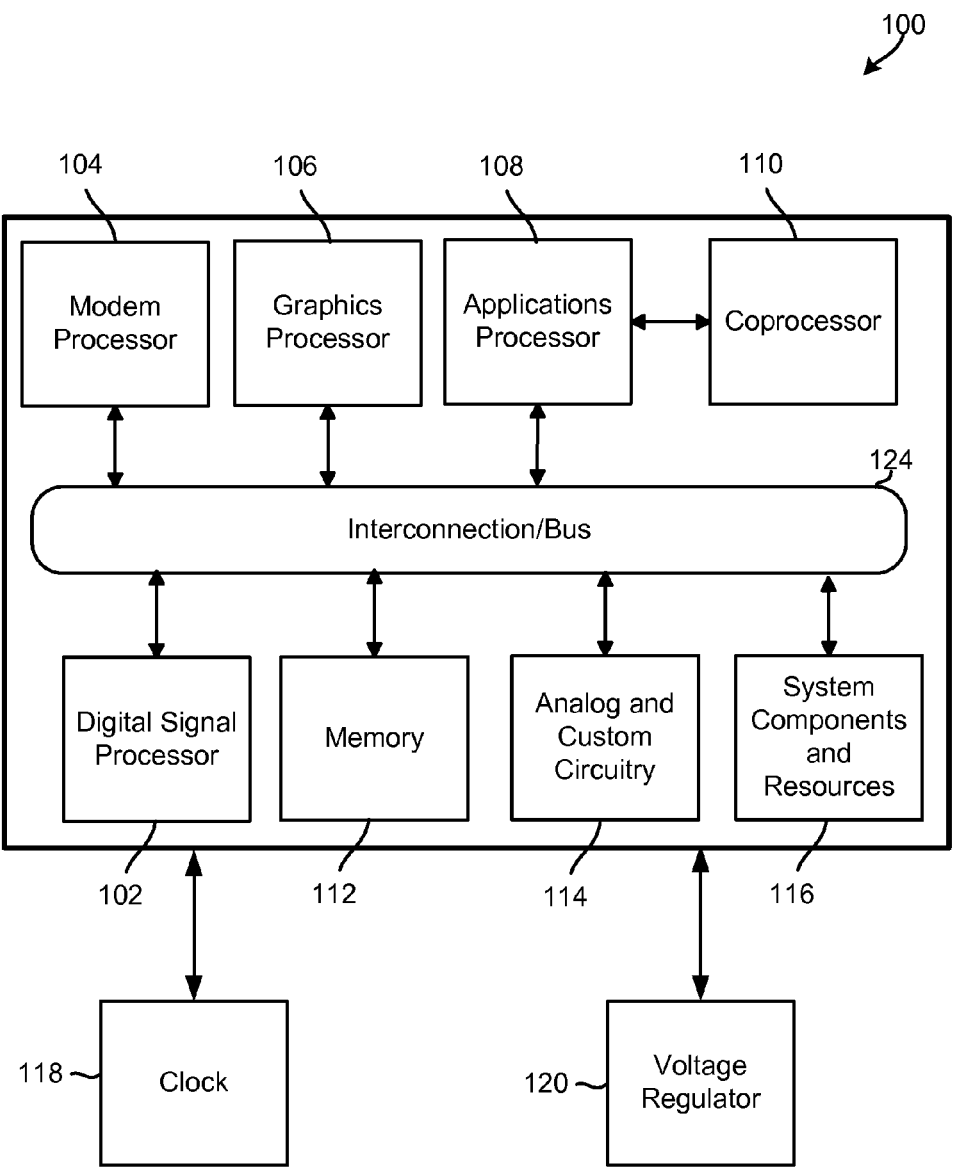
FIG. 1 is an architectural diagram of an example system on chip suitable for implementing the various aspects.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used generically herein to refer to any one or all of servers, personal computers, mobile devices, cellular telephones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various aspects are particularly useful in mobile devices, such as smartphones, which have limited processing power and battery life, the aspects are generally useful in any computing device that includes a programmable processor.

In overview, the various aspects include methods, as well as computing devices and processors configured to execute the methods, that enable executing a general purpose application on an auxiliary processor of a computing device. The method may include creating in the application processor a first process and a second process, both of which have a first context. When executed, the second process may invoke a first service of the auxiliary processor that causes the second process to enter a blocked state. Then, when the first process is executed it invokes a second service of the auxiliary processor and unblocks the second process in response to receiving a communication from the first service of the auxiliary processor. Execution of the second process operations on the application processor sends the first context to the auxiliary processor, which enables the auxiliary processor to accomplish the service invoked by the first process using the received context. The auxiliary processor may then send the results of the second service to the first process executing on the applications processor.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used herein to refer to a single integrated circuit (IC) chip or chip package that contains two or more independent processing cores (e.g., CPU cores) configured to read and execute program instructions. A SOC may include multiple multicore processors, and each processor in an SOC may be referred to as a core. The term "multiprocessor" is used herein to refer to a system or device that includes two or more processing units configured to read and execute program instructions.

As used in this application, the terms "component," "module," "system," "service," "engine," "listener," "manager," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core, and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "context information" is used herein to refer to any information available to a process running in a host operating system (e.g., Android, Windows 8, LINUX, etc.), and may include operational state data and permissions and/or access restrictions that identify the operating system services, libraries, file systems, and other resources that the process or the application program may access.

Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g. program counter, stack pointer, instruction register, program status word, etc.), accounting information, permissions, access restrictions, and state information.

A process's state information may include information that indicates whether the process is a running state, a ready state, a blocked state, etc. A process is in the running state when its procedure is being executed by a processor. A process is in the ready state when all the process's perquisites for execution have been meet (e.g., memory and resources are available, etc.) and the process is waiting to be assigned a processor. A process is in the blocked state when it is waiting for the occurrence of an event (e.g., input/output completion event, etc.).

A process may spawn other processes, and the spawned process (i.e., a child process) may inherit some of the permissions and access restrictions (i.e., context) of the spawning process (i.e., the parent process). A process may also be a heavy-weight process that includes multiple lightweight processes or threads, which are processes that share all or portions of their context (e.g., address space, stack, permissions and/or access restrictions, etc.) with other processes/threads. Thus, a single process may include multiple threads that share, have access to, and/or operate within a single context (i.e., the processor's context).

Generally, processes that share, have access to, and/or operate within the same context may communicate via fast memory read/write operations. On the other hand, communications between independent processes that do not share a context are often accomplished via relatively slow function calls, method invocations, procedure calls, message exchanges, domain sockets (e.g., Unix-domain sockets), and other forms of inter-process communication (IPC).

Remote procedure calls (RPC) and remote method invocations (RMI) are inter-process communications (IPC) that allow a calling process to cause a subroutine, procedure, process, or service (herein collectively "service") to execute in another address space, commonly on another processor, chip, or computing device.

In multiprocessor and distributed computing systems, the memory and resources available to different processors are often in separate domains (e.g., protection domains, physical domains, etc.). In addition, each of the multiple processors may be configured with a different operating system and/or implement different hardware description languages (HDL) or instruction set architectures (ISA). In such systems, RPC/RMI mechanisms may provide a well-defined interface that allows a calling process on a first processor to cause a service to execute in a second processor, and for the second processor to send the results of the execution of the service back to the first processor.

In certain situations, the called/invoked service may require access to information that is not readily available to processes that do not share the same context as the calling process. In such situations, existing RPC solutions require that the calling process include in the procedure call/method invocation all the context information (i.e., state information, permissions, etc.) that is to be used by the called service.

Including context information in a procedure call or method invocation is an inefficient use of mobile device resources. In addition, the processor of the calling process and the processor of the called/invoked service may have different operating systems and/or implement different hardware description languages (HDL). In such cases, the called service may be required to perform complex and power intensive operations to recreate the calling process's context so that the environment of the called service is consistent with the operating system of calling process. Further, recreating the context may require modifications to the kernel or host operating system of the application processor on which the calling process executes. For these and other reasons, existing solutions may degrade or reduce the performance and power consumption characteristics of a mobile device, and degrade the user experience.

The various aspects provide improved solutions for invoking services on an auxiliary processor, such as a digital signal processor, modem processor, coprocessor, etc.

Various aspects may include mechanisms for performing two-way and/or reverse procedure calls in a computing device or across a network. Such two-way and/or reverse procedure calls may allow an auxiliary processor to perform operations that include subroutines that require access to an application processor's or a calling process's context information, without requiring the calling process to send the context information to the auxiliary processor (e.g., as part of the procedure call/method invocation, etc.).

Various aspects may perform two-way and/or reverse procedure calls to offload the bulk of processing operations from a general purpose processor to an auxiliary processor, while performing operations that require access to context information locally on the general purpose processor. Various aspects may implement the two-way and/or reverse procedure calls in the user space of an operating system, without any modifications to the kernel.

The various aspects improve the performance and/or power consumption characteristics of a computing device by reducing the overheads associated with communicating context information between a general purpose processor (e.g., an application processor, CPU, etc.) and an auxiliary processor. The various aspects also improve the performance and/or power consumption characteristics of a computing device by reducing the overheads associated with re-creating a context of the calling process or application processor on a second/auxiliary processor.

Various aspects may include systems, methods, and devices configured to generate a primary process (or thread) and a plurality of secondary processes (or threads) on an application processor within the same context and/or so that the primary and secondary processes have access to the same context information. The primary process may include a procedure for accomplishing one or more operations of a general purpose software application, and each of the secondary processes may include a procedure for accomplishing a subroutine of the primary process that requires access to the context information.

The secondary processes may be configured to invoke a service on an auxiliary processor that causes the secondary processes to enter a block state. While the secondary processes remain in the blocked state, the primary process may invoke a service on the auxiliary processor. The service may begin executing subroutines on the auxiliary processor to accomplish one or more operations or tasks of the primary process.

When the service encounters a subroutine that requires access to the context information, the service may unblock a secondary process suitable for accomplishing the encountered subroutine and/or retrieving the required context information. The unblocked secondary process may execute on the application processor within the context of the primary process to retrieve the context information required by the service and/or to accomplish operations that require access to the context information. In an aspect, the service may enter a wait or blocked state while the unblocked secondary process executes on the application processor. In another aspect, the service may continue processing tasks while the unblocked secondary process executes on the application processor. Thus, in an aspect, the service and secondary process may execute at the same time or in parallel.

The unblocked secondary process may send the retrieved context information and/or results of its processing to the auxiliary processor and return to the blocked state. The service may use information received from the secondary process to perform additional operations on the auxiliary processor, and send a notification and/or the results of its operations to the primary process. The primary process may use the received results to complete the operations of the general purpose software application and/or update its status based on the received notification. In this manner, the primary process may offload general purpose processing operations to the auxiliary processor without sending the auxiliary processor cumbersome context information (e.g., as part of the procedure call/method invocation, etc.).

The various aspects may be implemented on a number of multiprocessor computer systems, including a system-on-chip (SOC). FIG. 1 illustrates an example system-on-chip (SOC) 100 architecture that may be used in computing devices implementing the various aspects. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor, etc.) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio and video signals for rendering in a web browser. The SOC 100 may further include system components and resources 116, such as voltage regulators, oscillators, phase-locked loops, peripheral bridges, data controllers, memory controllers, system controllers, access ports, timers, and other similar components used to support the processors and software clients (e.g., a web browser, etc.) running on a computing device.

The system components/resources 116 and custom circuitry 114 may also include circuitry to interface with peripheral devices, such as cameras, electronic displays, wireless communication devices, external memory chips, etc. The processors 102, 104, 106, 108 may be interconnected to each other and one or more memory elements 112, system components and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., a DSP 102, a modem processor 104, a graphics processor 106, an application processor 108, etc.).

The processors 102, 104, 106, 108, 110 may be independent processing cores that are in close proximity (e.g., on a single substrate, die, integrated chip, etc.) to one another. The proximity of the processors 102, 104, 106, 108, 110 allows memory 112 to operate at a much higher frequency/clock-rate than is possible if the signals have to travel off-chip. Moreover, the proximity of the processors 102, 104, 106, 108, 110 allows for the sharing of on-chip memory and resources (e.g., voltage rail), as well as for more coordinated cooperation between cores.

Multiprocessor hardware designs, such as those discussed above with reference to FIG. 1, may include multiple processing cores of different capabilities inside the same package, often on the same piece of silicon. Symmetric multiprocessing hardware includes two or more identical processors connected to a single shared main memory that are controlled by a single operating system. Asymmetric or "loosely-coupled" multiprocessing hardware may include two or more heterogeneous processors/cores that may each be controlled by an independent operating system and hardware description language or instruction set architecture, and connected to one or more shared memories/resources.

Figure 2:
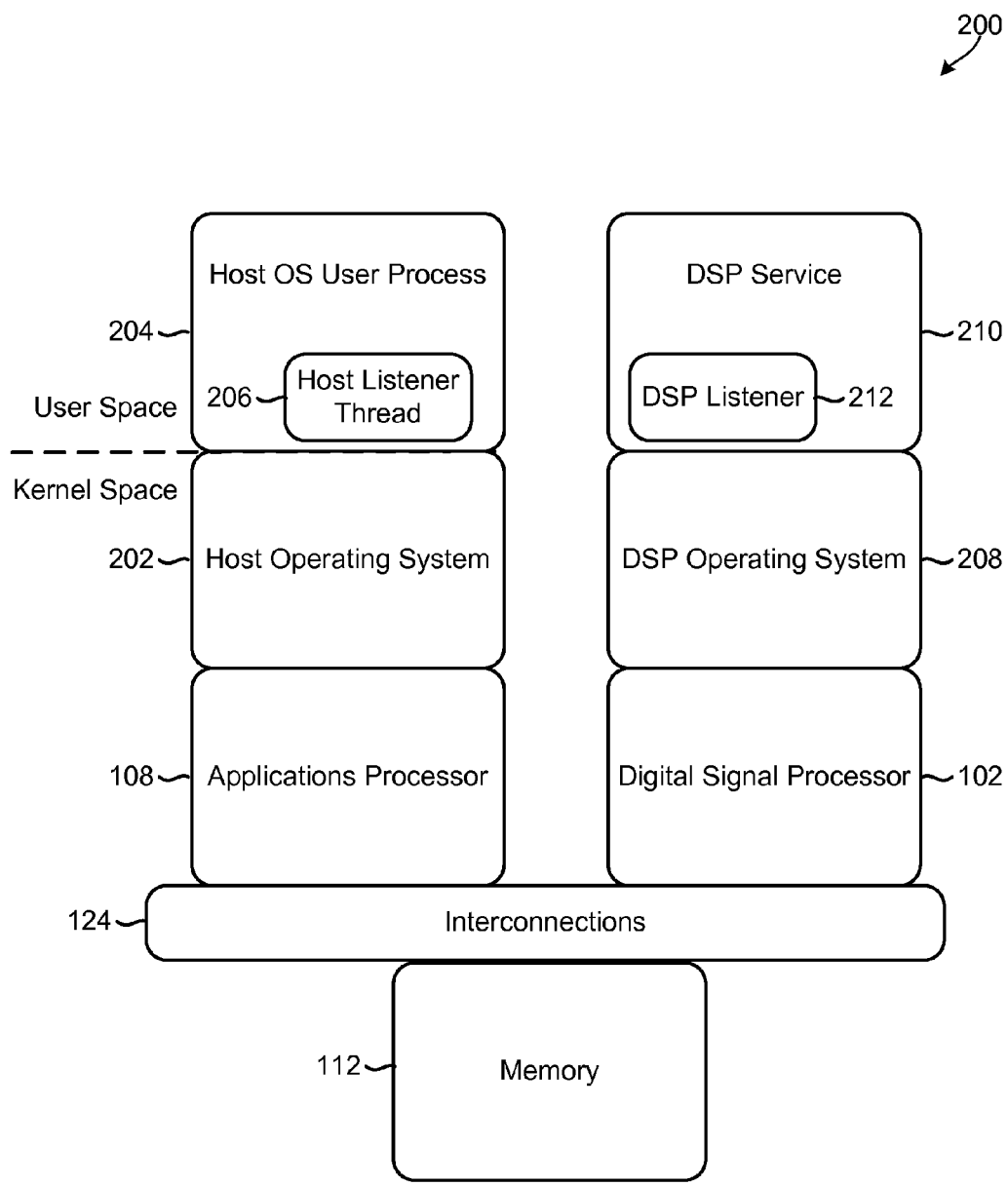
FIG. 2 is a layered block diagram illustrating example logical and functional components in a computing system configured to perform procedure calls in accordance with the various aspects.

FIG. 2 illustrates example logical and functional components in an aspect computing system 200 configured to perform two-way and/or reverse remote procedure calls. The illustrated computer system 200 includes both hardware components and software components. The hardware components may include an application processor 108, a digital signal processor (DSP) 102, an interconnections module 124, and a memory 112 module.

The software components may include a host operating system 202, a host operating system user process 204, a host listener thread 206, a DSP operating system 208, a DSP service 210, and a DSP listener 212. In an aspect, the host operating system 202 may include a library module (not illustrated) configured to receive high-level language (HLL) library calls from the host operating system user process 204 and invoke operating system services (e.g., via operating system calls) on the host operating system 202. In an aspect, the host operating system user process 204 may be a process of a software application program.

The host operating system user process 204 may include or reference context information, which may include operational state data and permissions and/or access restriction information that identify the services, libraries, file systems, and other resources of the host operating system user process 204 that the host operating system user process 204 may access. The host listener thread 206 may be a thread of the host operating system user process 204 that has access to the context information of the host operating system user process 204.

The DSP service 210 may be a subroutine, procedure, process, or service configured to cause the digital signal processor 102 perform one or more operations. The DSP service 210 may also provide a thread context for the host operating system user process 204. The DSP listener 212 may be a thread of the DSP service 210. The DSP listener 212 may provide a thread context for the host listener thread 206.

Figure 3:
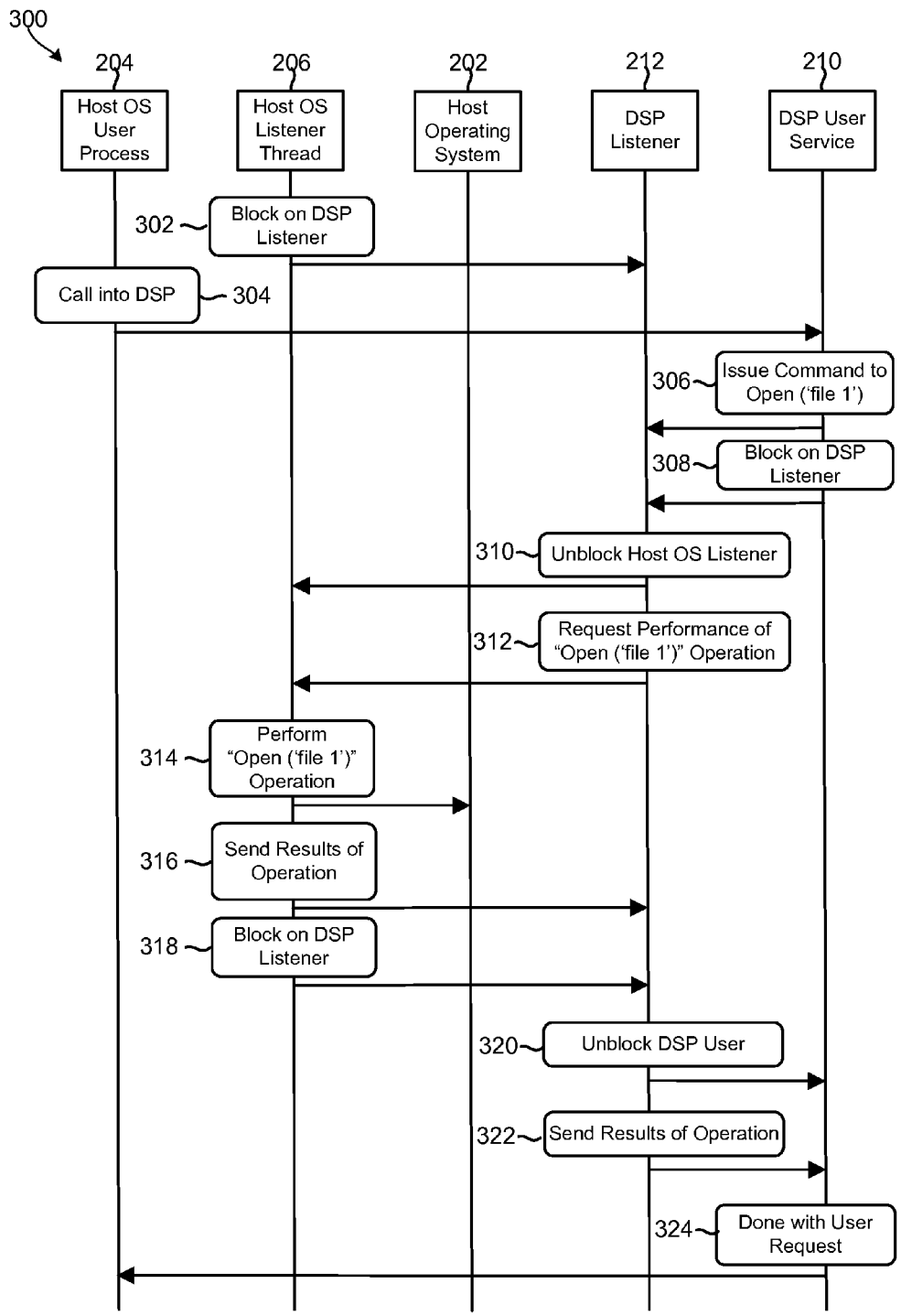
FIG. 3 is a process flow diagram of an aspect method of performing procedure calls to execute general purpose application operations on an auxiliary processor.

FIG. 3 illustrates an aspect method 300 for performing remote procedure calls to offload the bulk of a general purpose process's workload to an auxiliary processor. In block 302, a host operating system listener thread 206 may call a service of the auxiliary processor that causes the host operating system listener thread 206 to enter a blocked state indefinitely while it waits for an instruction from a DSP listener 212.

In block 304, a host operating system user process 204 may invoke a DSP user service 210, which may begin performing general application program operations on the auxiliary processor. The DSP user service 210 may continue to perform the general application program operations until it encounters an operation or a subroutine that requires access to services of the host operating system 202 and/or requires access to the context information of the host operating system user process 204. In the example illustrated in FIG. 3, the DSP user service 210 continues to perform the general application program operations until it encounters an "open ('file 1')" operation.

In block 306, the DSP user service 210 may issue a command to the DSP listener 212 thread to perform the encountered "open ('file 1')" operation. In block 308, the DSP user service 210 may enter a blocked state indefinitely while it waits for an instruction from the DSP listener 212. In an aspect, the operations of blocks 306 and 308 may be accomplished in a single operation.

In block 310, the DSP listener 212 may unblock the host operating system listener thread 206. In block 312, the DSP listener 212 may instruct the host operating system listener thread 206 to perform the "open ('file 1')" operation. In an aspect, the operations of blocks 310 and 312 may be accomplished in a single operation.

In block 314, the host operating system listener thread 206 may perform the "open ('file 1')" operation on the host operating system 202. In block 316, the host operating system listener thread 206 may send the results of the "open ('file 1')" operation to the DSP listener 212 thread. In block 316, the host operating system listener thread 206 may reenter the blocked state while it waits for further instructions from a DSP listener 212. In an aspect, the operations of blocks 316 and 318 may be accomplished in a single operation.

In block 320, the DSP listener 212 may unblock the DSP user service 210. In block 322, the DSP listener 212 may send the results of the "open ('file 1')" operation to the DSP user service 210. In an aspect, the operations of blocks 320 and 322 may be accomplished in a single operation.

In block 324, the DSP user service 210 may perform the remaining general application program operations with the results of the "open ('file 1')" operation received from the DSP listener 212, and return the results of those operations to the host operating system user process 204. In this manner, the DSP user service 210 may invoke services on the host operating system 202 without recreating the context of the host operating system 202. In addition, the host operating system user process 204 is not required to send its context information to the DSP user service 210, which reduces the amount of information communicated between the general purpose processor and the auxiliary processor.

Figure 4:
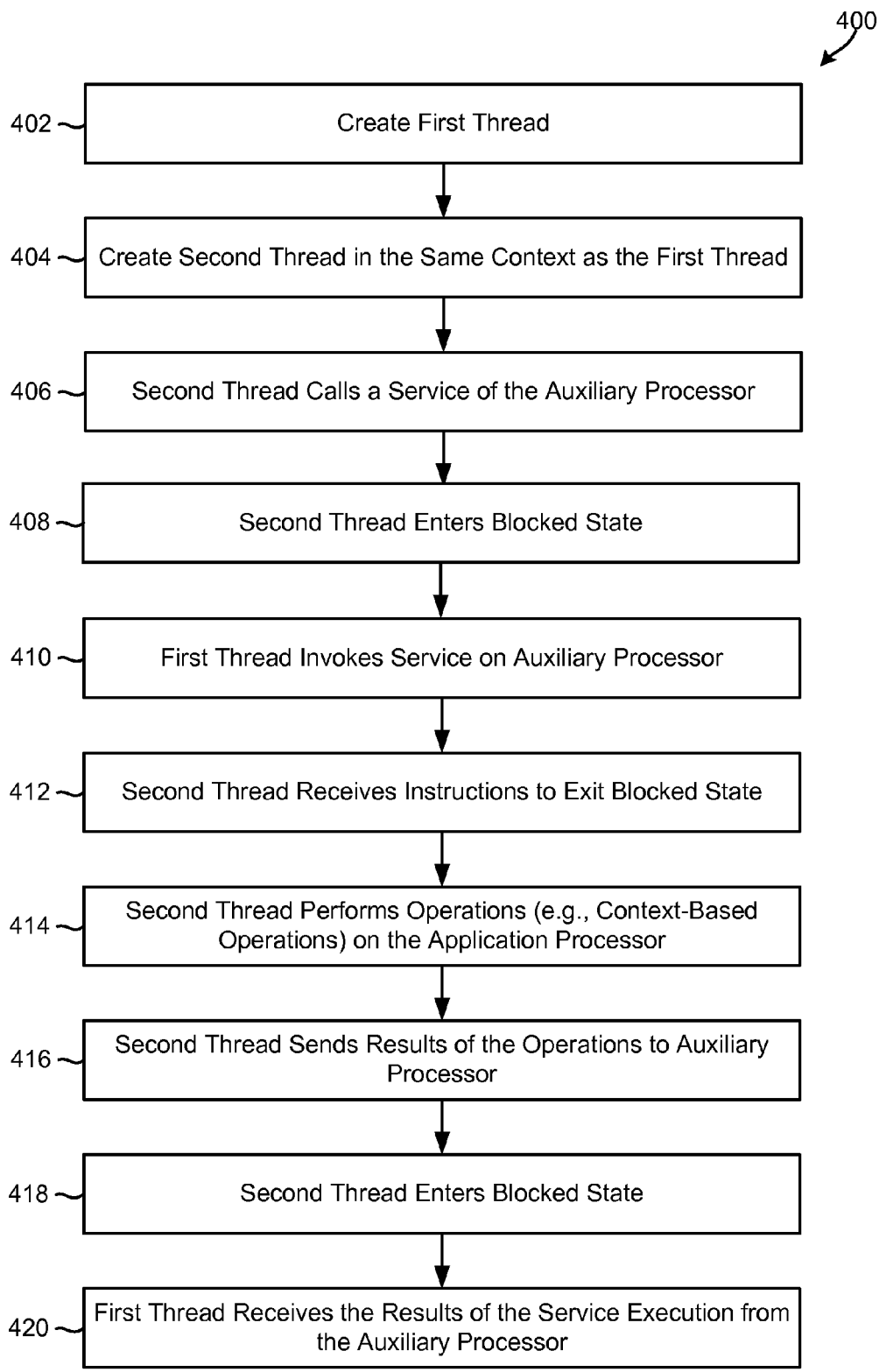
FIG. 4 is a process flow diagram of an aspect application processor method of performing procedure calls in accordance with an aspect.

FIG. 4 illustrates an aspect application processor method 400 for offloading operations that require access to operating system services to an auxiliary processor. In block 402, the application processor may create a first process that includes operations that may be offloaded to an auxiliary processor. In block 404, the application processor may create a second process in the same context as the first process. In an aspect, the second process may be a thread of the first process. In an aspect, the first process may be a host operating system user process 204 and the second process may be a host operating system listener thread 206.

In block 406, the second process may call a service of the auxiliary processor that causes the second process to enter a blocked state indefinitely. In block 408, the second process may enter the blocked state and wait for instructions from the auxiliary processor.

In block 410, the first process may offload its operations to the auxiliary processor by invoking a service of the auxiliary processor. In block 412, the second process may receive instructions from the auxiliary processor to exit the block state and to perform one or more operations on the application processor. In block 414, the second process may perform the one or more operations on the application processor. In block 416, the second process may send the results of the operations performed on the application processor to the auxiliary processor. In block 418, the second process may enter the block state. In block 420, the first process may receive the results of the service execution from the auxiliary processor.

Figure 5:
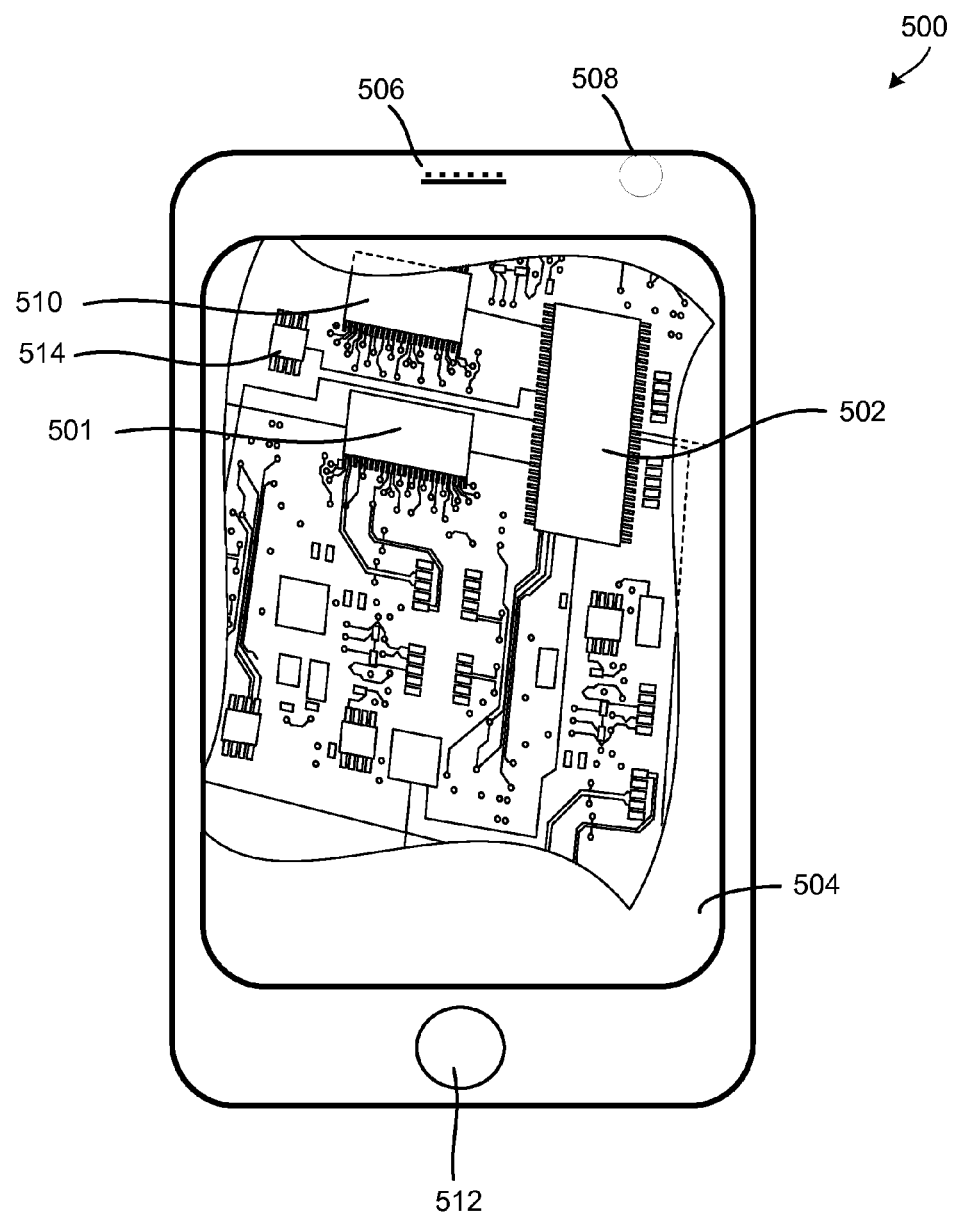
FIG. 5 is an illustration of an example smartphone suitable for use with the various embodiments.
Figure 6:
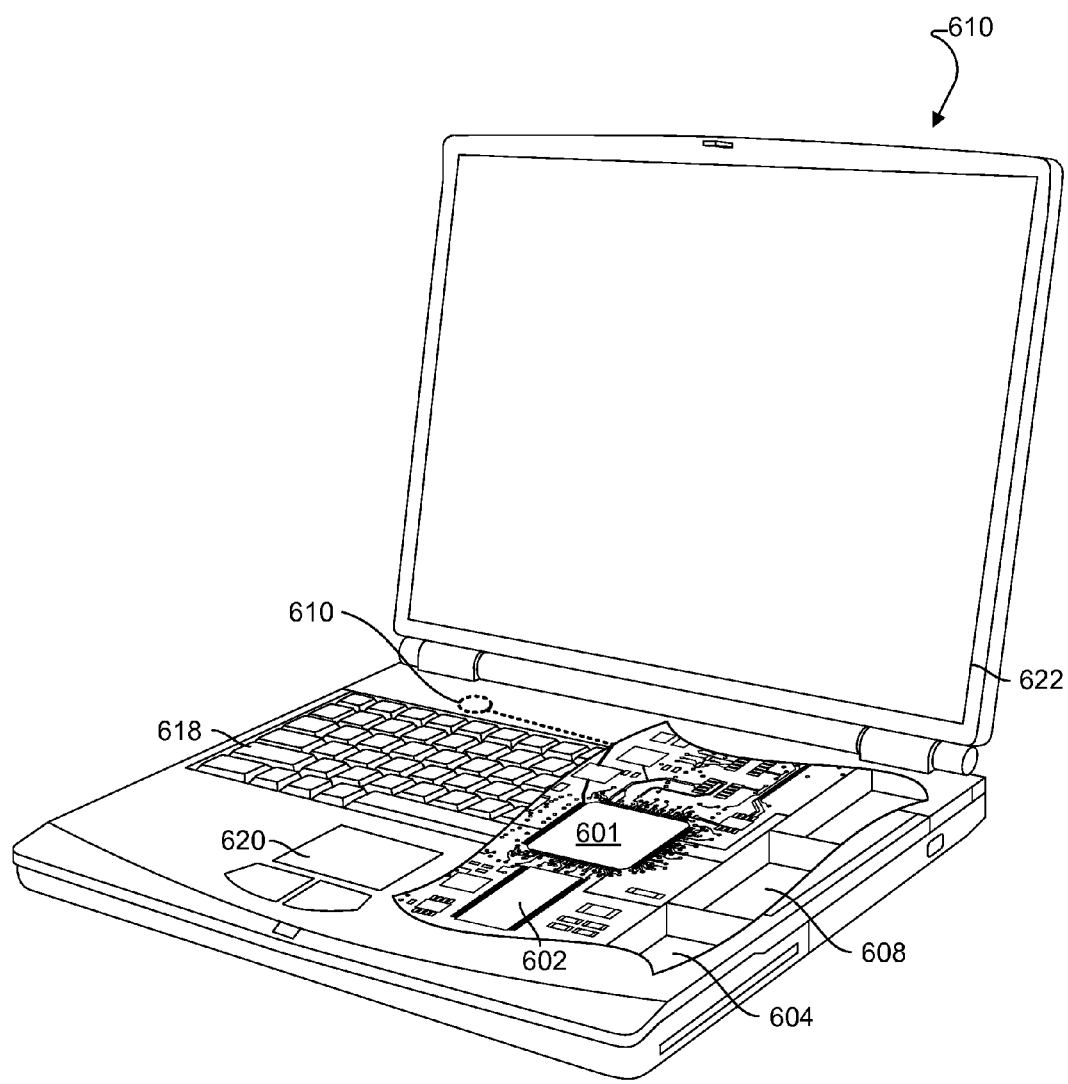
FIG. 6 is an illustration of an example laptop computer suitable for use with the various embodiments.
Figure 7:
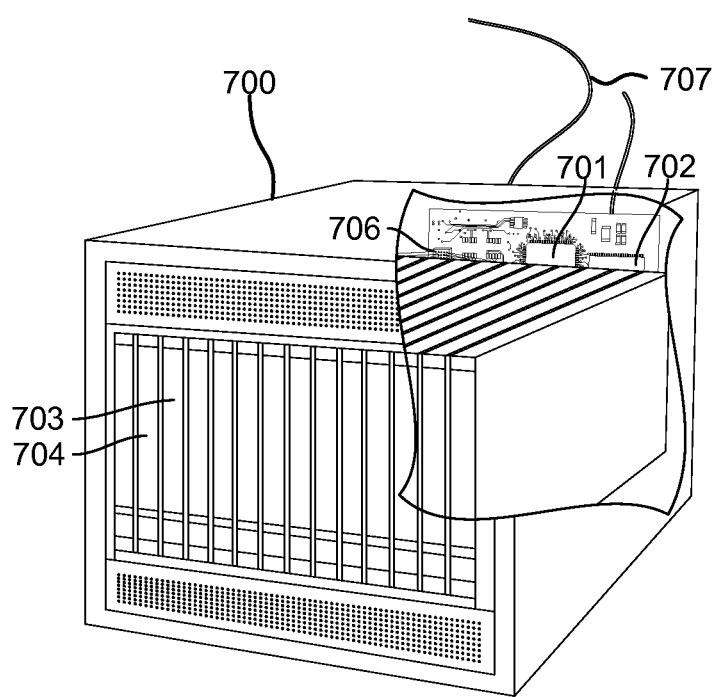
FIG. 7 is an illustration of an example server computer suitable for use with the various embodiments.

The various aspects may be implemented on a variety of computing devices, examples of which are illustrated in FIGS. 5-7. FIG. 5 illustrates a smartphone 500 that includes a multi-core processor 501 coupled to internal memory 502, a display 504 (e.g., touch screen display), and to a speaker 506. Additionally, the smartphone 500 may include an antenna 508 for sending and receiving electromagnetic radiation that may be connected to a wireless data link and/or a modem or cellular telephone transceiver 510 coupled to the multi-core processor 501. A smartphone 500 typically also includes menu selection buttons or rocker switches 512 for receiving user inputs.

The multi-core processor 501 may include circuits and structure similar to those described above and illustrated in FIGS. 1-2. The modem 1501 may also include multiple processing cores, and may be coupled to an antenna 508 for receiving and transmitting radio frequency signals.

A typical smartphone 500 also includes a sound encoding/decoding (CODEC) circuit 514, which digitizes sound received from a microphone into data packets suitable for wireless transmission and decodes received sound data packets to generate analog signals that are provided to the speaker to generate sound. Also, one or more of the multi-core processor 501, wireless transceiver 510 and CODEC 514 may include a digital signal processor (DSP) circuit (not shown separately).

Typical mobile computing devices will have in common the components illustrated in FIG. 6, which illustrates an example personal laptop computer 600. Such a personal computer 600 generally includes a multi-core processor 601 coupled to volatile memory 602 and a large capacity nonvolatile memory, such as a disk drive 604. The computer 600 may also include a compact disc (CD) and/or DVD drive 608 coupled to the processor 801. The computer device 600 may also include a number of connector ports coupled to the processor 601 for establishing data connections or receiving external memory devices, such as a network connection circuit for coupling the processor 601 to a network. The computing device 600 may have a radio/antenna 610 for sending and receiving electromagnetic radiation that is connected to a wireless data link coupled to the processor 601. The computer 600 may further include keyboard 618, a pointing a mouse pad 620, and a display 622 as is well known in the computer arts.

The various aspects may also be implemented on any of a variety of commercially available server devices, such as the server 700 illustrated in FIG. 7. Such a server 700 typically includes multiple processor systems one or more of which may be or include a multi-core processor 701. The processor 701 may be coupled to volatile memory 702 and a large capacity nonvolatile memory, such as a disk drive 703. The server 700 may also include a floppy disc drive, compact disc (CD) or DVD disc drive 704 coupled to the processor 701. The server 700 may also include network access ports 706 coupled to the processor 701 for establishing data connections with a network 707, such as a local area network coupled to other broadcast system computers and servers.

The processors 501, 601, 701 may be any programmable multi-core multiprocessor, microcomputer or multiple processor chips that can be configured by software instructions (applications) to perform a variety of functions, including the functions and operations of the various aspects described herein. Multiple processors may be provided, such as one processor dedicated to wireless communication functions and one processor dedicated to running other applications. Typically, software applications may be stored in the internal memory 502, 602, 702 before they are accessed and loaded into the processor 501, 601, 701. In some mobile computing devices, additional memory chips (e.g., a Secure Data (SD) card) may be plugged into the mobile device and coupled to the processor 501, 601, 701. The internal memory 502, 602, 702 may be a volatile or nonvolatile memory, such as flash memory, or a mixture of both. For the purposes of this description, a general reference to memory refers to all memory accessible by the processor 501, 601, 701, including internal memory 502, 602, 702, removable memory plugged into the mobile device, and memory within the processor 501, 601, 701 itself.

The foregoing method descriptions and the process flow diagrams are provided merely as illustrative examples and are not intended to require or imply that the blocks of the various aspects must be performed in the order presented. As will be appreciated by one of skill in the art the order of blocks in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of executing general purpose application operations on an auxiliary processor, comprising:
creating in an application processor of a computing device a first process and a second process, the first and second process having a first context;
invoking by the second process of the application processor a first service of the auxiliary processor, the first service causing the second process to enter a blocked state;
invoking by the first process a second service of the auxiliary processor, the second service having a second context;
unblocking the second process in response to receiving a communication from the first service of the auxiliary processor;
performing, by the unblocked second process, context-based operations within the first context in the application processor;
sending a result of performing context-based operations from the application processor to the auxiliary processor, the auxiliary processor performing additional operations based on the result of performing context-based operations to accomplish the second service; and
receiving by the first process information generated in the auxiliary processor when accomplishing the second service.

2. The method of claim 1, wherein invoking a first service of the auxiliary processor comprises invoking the first service in a digital signal processor.

3. The method of claim 1, wherein invoking a first service of the auxiliary processor comprises invoking the first service in a modem processor.

4. The method of claim 1, wherein invoking a first service of the auxiliary processor comprises invoking the first service in a processor of the computing device.

5. The method of claim 1, wherein invoking a first service of the auxiliary processor comprises invoking the first service in a processor of a remote computing device.

6. The method of claim 1, wherein performing context-based operations in the application processor comprises:
performing, by the unblocked second process, context-based operations in the application processor to generate context-based information required by the second service to perform the additional operations in the auxiliary processor.

7. The method of claim 6, wherein sending a result of performing context-based operations from the application processor to the auxiliary processor comprises the application processor pushing the generated context-based information onto a communication bus.

8. A computing device, comprising:
a processor;
a application processor executed on the processor configured with processor-executable instructions to perform operations comprising:
creating a first process and a second process in the application processor, the first and second process having a first context;
invoking by the second process of the application processor a first service of an auxiliary processor, the first service causing the second process to enter a blocked state;
invoking by the first process a second service of the auxiliary processor, the second service having a second context;
unblocking the second process in response to receiving a communication from the first service of the auxiliary processor;
performing, by the unblocked second process, context-based operations within the first context;
sending a result of performing context-based operations to the auxiliary processor to cause the auxiliary processor to perform additional operations based on the result of performing context-based operations to accomplish the second service; and
receiving by the first process information generated in the auxiliary processor when accomplishing the second service.

9. The computing device of claim 8, wherein the auxiliary processor is a digital signal processor and the application processor is configured with processor-executable instructions such that invoking a first service of the auxiliary processor comprises invoking a service of the digital signal processor.

10. The computing device of claim 8, wherein the auxiliary processor is a modem processor and the application processor is configured with processor-executable instructions such that invoking a first service of the auxiliary processor comprises invoking a service of the modem processor.

11. The computing device of claim 8, wherein the application processor is configured with processor-executable instructions such that invoking a first service of the auxiliary processor comprises invoking the first service in a processor of the computing device.

12. The computing device of claim 8, wherein the application processor is configured with processor-executable instructions such that invoking a first service of the auxiliary processor comprises invoking the first service in a processor of a remote computing device.

13. The computing device of claim 8, wherein the application processor is configured with processor-executable instructions such that performing context-based operations in the application processor comprises:
performing, by the unblocked second process, context-based operations in the application processor to generate context-based information required by the second service to perform the additional operations in the auxiliary processor.

14. The computing device of claim 13, further comprising a communication bus, wherein the application processor is configured with processor-executable instructions such that sending a result of performing context-based operations from the application processor to the auxiliary processor comprises the application processor pushing the generated context-based information onto the communication bus.

15. A computing device, comprising:
an application processor;
means for creating a first process and a second process in the application processor so that the first and second process have a first context;
means for causing the second process of the application processor to invoke a first service of an auxiliary processor, the first service causing the second process to enter a blocked state;
means for causing the first process to invoke a second service of the auxiliary processor, the second service having a second context;
means for unblocking the second process in response to receiving a communication from the first service of the auxiliary processor;

means for causing the unblocked second process to perform context-based operations within the first context in the application processor;

means for sending a result of performing context-based operations from the application processor to the auxiliary processor to cause the auxiliary processor to perform additional operations based on the result of performing context-based operations to accomplish the second service; and means for receiving in the application processor information generated in the auxiliary processor when accomplishing the second service.

16. The computing device of claim 15, wherein means for invoking a first service of the auxiliary processor comprises means for invoking the first service in a digital signal processor.

17. The computing device of claim 15, wherein means for invoking a first service of the auxiliary processor comprises means for invoking the first service in a modem processor.

18. The computing device of claim 15, wherein means for invoking a first service of the auxiliary processor comprises means for invoking the first service in a processor of the computing device.

19. The computing device of claim 15, wherein means for invoking a first service of the auxiliary processor comprises means for invoking the first service in a processor of a remote computing device.

20. The computing device of claim 15, wherein means for performing context-based operations in the application processor comprises:

means for performing, by the unblocked second process, context-based operations in the application processor to generate context-based information required by the second service to perform the additional operations in the auxiliary processor.

21. The computing device of claim 20, wherein means for sending a result of performing context-based operations from the application processor to the auxiliary processor comprises means for pushing the generated context-based information onto a communication bus.

22. A non-transitory computer readable storage medium having stored thereon application processor-executable software instructions configured to cause an application processor to perform operations for offloading general purpose application operations to an auxiliary processor, the operations comprising:

creating in the application processor a first process and a second process, the first and second process having a first context;

invoking by the second process of the application processor a first service of the auxiliary processor, the first service causing the second process to enter a blocked state;

invoking by the first process a second service of the auxiliary processor, the second service having a second context;

unblocking the second process in response to receiving a communication from the first service of the auxiliary processor;

performing, by the unblocked second process, context-based operations within the first context in the application processor;

sending a result of performing context-based operations from the application processor to the auxiliary processor, the auxiliary processor performing additional operations based on the result of performing context-based operations to accomplish the second service; and receiving by the first process information generated in the auxiliary processor when accomplishing the second service.

23. The non-transitory computer readable storage medium of claim 22, wherein the stored processor-executable software instructions are configured to cause a processor to perform operations such that invoking a first service of the auxiliary processor comprises invoking the first service in a digital signal processor.

24. The non-transitory computer readable storage medium of claim 22, wherein the stored processor-executable software instructions are configured to cause a processor to perform operations such that invoking a first service of the auxiliary processor comprises invoking the first service in a modem processor.

25. The non-transitory computer readable storage medium of claim 22, wherein the stored processor-executable software instructions are configured to cause a processor to perform operations such that invoking a first service of the auxiliary processor comprises invoking the first service in a computing device including the auxiliary processor.

26. The non-transitory computer readable storage medium of claim 22, wherein the stored processor-executable software instructions are configured to cause a processor to perform operations such that invoking a first service of the auxiliary processor comprises invoking the first service in a remote computing device.

27. The non-transitory computer readable storage medium of claim 22, wherein the stored processor-executable software instructions are configured to cause a processor to perform operations such that performing context-based operations in the application processor comprises:

performing, by the unblocked second process, context-based operations in the application processor to generate context-based information required by the second service to perform the additional operations in the auxiliary processor.

28. The non-transitory computer readable storage medium of claim 27, wherein the stored processor-executable software instructions are configured to cause a processor to perform operations such that sending a result of performing context-based operations from the application processor to the auxiliary processor comprises the application processor pushing the generated context-based information onto a communication bus.

29. A system, comprising:

a processor;

an auxiliary processor;

a application processor executed on the processor coupled to the auxiliary processor, wherein the application processor is configured with application processor-executable instructions to perform operations comprising:

creating a first process and a second process in the application processor, the first and second process having a first context;

invoking by the second process of the application processor a first service of the auxiliary processor to cause the second process to enter a blocked state;

invoking by the first process a second service of the auxiliary processor;

unblocking the second process in response to receiving a communication from the first service of the auxiliary processor;

performing, by the unblocked second process, context-based operations within the first context;

sending a result of performing context-based operations to the auxiliary processor; and receiving by the first process information generated in the auxiliary processor when accomplishing the second service, and wherein the auxiliary processor is configured with auxiliary processor-executable instructions to perform operations comprising:

executing the first service to cause the second process of the application processor to enter the blocked state;

executing the second service in response to receiving a procedure call from the first process;

suspending execution of the second service upon encountering operations requiring access to the first context;

sending, from the first service, the communication to unblock the second process in the application processor;

receiving the result of performing context-based operations performed on the application processor in the first context; and resuming execution of the second service and performing additional operations based on the received result of performing context-based operations.

30. The system of claim 29, wherein the auxiliary processor is a digital signal processor and the application processor is configured with processor-executable instructions such that invoking a first service of the auxiliary processor comprises invoking a service of the digital signal processor.

31. The system of claim 29, wherein the auxiliary processor is a modem processor and the application processor is configured with processor-executable instructions such that invoking a first service of the auxiliary processor comprises invoking a service of the modem processor.

32. The system of claim 29, wherein the application processor is configured with processor-executable instructions such that invoking a first service of the auxiliary processor comprises invoking the first service in a processor of the system.

33. The system of claim 29, wherein the application processor is configured with processor-executable instructions such that invoking a first service of the auxiliary processor comprises invoking the first service in a processor of a remote computing device.

34. The system of claim 29, wherein the application processor is configured with processor-executable instructions such that performing context-based operations in the application processor comprises:

performing, by the unblocked second process, context-based operations in the application processor to generate context-based information required by the second service to perform the additional operations in the auxiliary processor.

35. The system of claim 34, further comprising a communication bus, wherein the application processor is configured with processor-executable instructions such that sending a result of performing context-based operations from the application processor to the auxiliary processor comprises the application processor pushing the generated context-based information onto the communication bus.

* * * * *